(12) United States Patent
Fujita

(10) Patent No.: US 7,644,703 B2
(45) Date of Patent: Jan. 12, 2010

(54) FUEL SUPPLY DEVICE OF MOTORCYCLE

(75) Inventor: Kazuhisa Fujita, Hamamatsu (JP)

(73) Assignee: Suzuki Kabushiki Kaisha, Hamamatsu-Shi, Shizuoka-Ken (JP)

( * ) Notice: Subject to any disclaimer, the term of this patent is extended or adjusted under 35 U.S.C. 154(b) by 0 days.

(21) Appl. No.: 12/049,617

(22) Filed: Mar. 17, 2008

(65) Prior Publication Data
US 2008/0230037 A1 Sep. 25, 2008

(30) Foreign Application Priority Data
Mar. 22, 2007 (JP) ............................. 2007-075176

(51) Int. Cl.
F02M 37/04 (2006.01)
(52) U.S. Cl. ..................................... 123/509
(58) Field of Classification Search ................. 123/509, 123/510, 511
See application file for complete search history.

(56) References Cited

U.S. PATENT DOCUMENTS

| | | | | |
|---|---|---|---|---|
| 5,988,213 A * | 11/1999 | Yoshioka | .................... | 137/590 |
| 6,253,790 B1 * | 7/2001 | Hara | ...................... | 137/565.17 |
| 6,401,750 B2 * | 6/2002 | Tokunaga | ............... | 137/565.34 |
| 6,907,865 B1 * | 6/2005 | Hanby | ......................... | 123/509 |
| 2005/0126546 A1 * | 6/2005 | Yagisawa | .................... | 123/509 |
| 2005/0173918 A1 * | 8/2005 | Eguchi et al. | ............... | 280/834 |
| 2005/0201877 A1 * | 9/2005 | Mitsudou | ............... | 417/423.14 |
| 2007/0199884 A1 * | 8/2007 | Nakagawa | ............... | 210/416.4 |

FOREIGN PATENT DOCUMENTS

| | | |
|---|---|---|
| JP | 2005-096504 | 4/2005 |
| JP | 2005-170273 | 6/2005 |
| JP | 2007-015468 | 1/2007 |

\* cited by examiner

Primary Examiner—Thomas N Moulis
(74) Attorney, Agent, or Firm—Barnes & Thornburg LLP

(57) ABSTRACT

A straddle type motorcycle includes a frame, an engine mounted on the frame and having a substantially vertical cylinder assembly and an intake air passage extended backward from a rear surface of the cylinder assembly, a fuel tank disposed above the cylinder assembly, and a fuel supply device. The fuel supply device includes a fuel pump disposed at a rear portion of the fuel tank, the fuel pump being overlapped with the cylinder assembly in a longitudinal direction of the motorcycle in a side view of the motorcycle, a fuel injector installed on the intake air passage, and a fuel hose connecting the fuel injector with the fuel pump.

5 Claims, 2 Drawing Sheets

FUEL SUPPLY DEVICE OF MOTORCYCLE

CROSS-REFERENCE TO RELATED APPLICATIONS

This application is a U.S. application based upon and claiming the benefit of priority to Japanese Patent Application No. 2007-075176, filed on Mar. 22, 2007, the contents of which are incorporated herein by reference.

BACKGROUND OF THE INVENTION

1. Field of the Invention

The present invention relates to a fuel supply device of a motorcycle.

2. Related Art

In a recent method of supplying fuel to an engine using a fuel injector, it is necessary for a motorcycle to be equipped with a fuel pump. In an example of installation place and installation method of the fuel pump include, a fuel pump is mounted on the upper surface of a crankcase behind a cylinder (as shown in Japanese Patent Laid-Open Publication No. 2005-096504), a fuel pump is housed inside of a side portion of a fuel tank having a horseshoe section straddling a frame pipe (as shown in Japanese Patent Laid-Open Publication No. 2007-015468), or a fuel pump is inserted from a upper side of a fuel tank (as shown in Japanese Patent Laid-Open Publication No. 2005-170273).

However, in a case where the fuel pump is mounted on the upper surface of a crankcase behind the cylinder, the fuel tank is disposed above the cylinder, and thus, a fuel pipe extending from the fuel tank to a fuel pump and a fuel pipe extending from the fuel pump to a fuel injector have long length. Therefore, it is required for a fuel pump to have a high discharging performance. Moreover, since an exhaust pipe exists near the fuel pipe, there is a possibility that percolation may occur, which is not preferable and disadvantageous.

On the other hand, in a case where a fuel pump is housed in one side of the fuel tank, the fuel pump can be housed only by disposing the fuel pump close to the front portion of the fuel tank because the fuel pump is relatively high, and the fuel pump is disposed far from an injector. As a result, the fuel pipe is made long, and a fuel pump having a high exhaust performance is hence required, which is not preferable.

Further, the side portion of the fuel tank needs a height dimension enough to house the fuel pump, and thus, it becomes necessary to lower a lower edge of the fuel tank or to set high a frame pipe. In the former case, since the engine mounting position becomes lower, a sufficient minimum road clearance cannot be secured. In the latter case, conversely, the position of the fuel tank is made high and then, the gravity center also becomes high. This leads to distribution of mass, and therefore, the vehicle body gravity center is not well balanced.

Furthermore, in the case of a mounting structure in which the fuel pump is inserted from the upper surface of the fuel tank, the fuel pipe is made long, and it is hence required for a fuel pump to have a high discharge performance. Further, since influence of fuel pipe deflection or expansion is intensified, still higher discharge performance is required, which is not preferable.

SUMMARY OF THE INVENTION

The present invention was conceived in consideration of the circumstances encountered in the prior art mentioned above, and an object thereof is to provide a fuel supply device of motorcycle capable of realizing lowering of gravity center, concentrated mass and shortened fuel pipe.

This and other objects can be achieved according to the present invention by providing a fuel supply device for a straddle type motorcycle, the motorcycle including a frame, an engine mounted on the frame and having a substantially vertical cylinder assembly and an intake air passage extended backward from a rear surface of the cylinder assembly, and a fuel tank disposed above the cylinder assembly, the fuel supply device comprising:

a fuel pump disposed at a rear portion of the fuel tank, the fuel pump being overlapped with the cylinder assembly in a longitudinal direction of the motorcycle in a side view of the motorcycle;

a fuel injector installed on the intake air passage; and a fuel hose connecting the fuel injector with the fuel pump.

In a preferred embodiment of this aspect, it may be desired that an exhaust pipe is connected to a front portion of the cylinder assembly, and a radiator is disposed in front of and above the cylinder assembly.

The fuel pump housed in the fuel tank may be disposed behind a cylinder center axis of the cylinder assembly. The fuel pump may include a downwardly extending portion extending downwardly from a bottom surface of the fuel tank.

The intake air passage may include a throttle body provided with the fuel injector at a top portion thereof, the fuel injector extends upwardly from a top surface of the throttle body, and the downwardly extending portion of the fuel pump is disposed between the cylinder center axis and the fuel injector in a side view of the motorcycle.

The fuel hose may be connected with a peripheral surface of the downwardly extending portion of the fuel pump.

According to the fuel supply device of the motorcycle of the present invention, the peripheral portion of the engine can be arranged compact and the entire height of the engine can be suppressed while securing the minimum road clearance. Accordingly, the gravity center can be lowered.

Furthermore, since a gap between the engine and the fuel tank is kept small, the fuel tank can be disposed in proximity of the engine, thus effectively achieving concentration of mass. Further, since the fuel pump is be disposed near the intake air passage, the length of the fuel pipe can be reduced.

The nature and further characteristic features of the present invention will be made clearer from the following descriptions made with reference to the accompanying drawings.

DESCRIPTION OF THE PREFERRED EMBODIMENT

A preferred embodiment of the present invention will be described hereunder with reference to the accompanying drawings. Further, it is to be noted that terms "upper", "lower", "right", "left" and the like terms are used herein with reference to the illustration of the drawings or in an usual standing state of a motorcycle.

Figure 1:
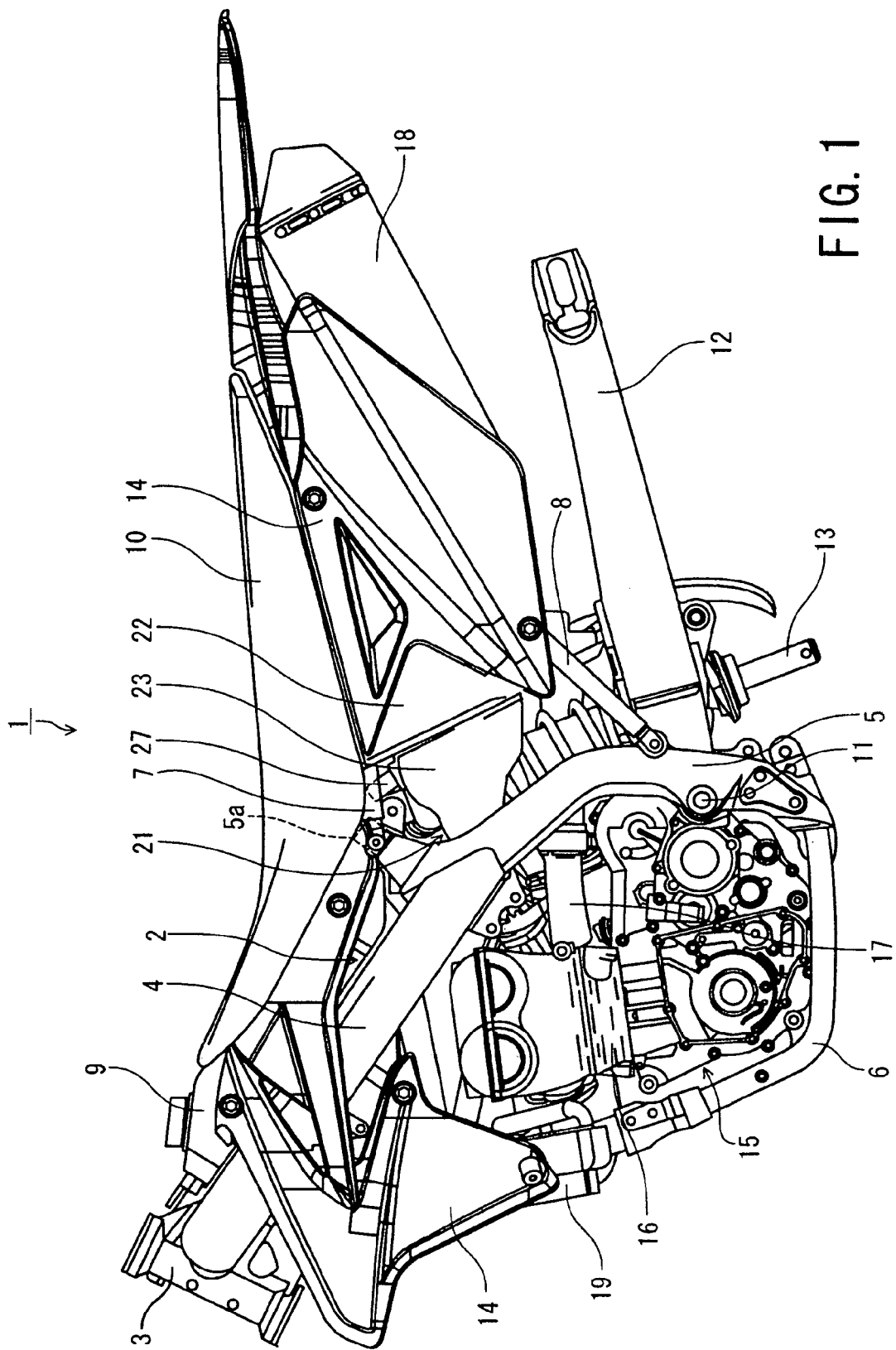
FIG. 1 is a left side view of a motorcycle showing an embodiment of a fuel supply device of the motorcycle of the present invention.

With reference to FIG. 1, a motorcycle 1 is of straddle type and has a vehicle frame 2 and a head pipe 3 mounted in front thereof. The head pipe 3 is provided with a steering mechanism including a pair of lateral front forks, which support a front wheel, not shown, rotatably, and a handlebar, not shown.

Meanwhile, the vehicle body frame 2 is for example of twin tube type, which mainly includes: a pair of lateral main frames 4 (right and left main frames) extended to the right and left directions just behind the head pipe 3 and extending obliquely downwardly in a backward direction in parallel to each other; a pair of lateral body frames 5 which are connected integrally to rear end portions of the main frames 4 and extend substantially vertically; a cradle frame 6 which extends substantially downward from the rear lower portion of the head pipe 3, and which is then bent backward and connected to the front of the lower end portion of the body frames 5; a pair of lateral seat rails 7 extending obliquely upwardly in a backward direction from the rear side of the upper end portion of the body frames 5; a pair of lateral support frames 8 extending obliquely upwardly in a backward direction from the rear end of substantially the central portion of the body frames 5 toward the rear end portion of the seat rails 7; and a bridge frame 5a formed at the upper end of the body frame 5 so as to connect the right and left body frames 5 together.

The fuel tank 9 is disposed between the right and left main frames 4 and a straddle type rider's seat 10 is disposed from the upper surface of the rear portion of the main frames 4 to a portion above the seat rails 7. A pivot shaft 11 is provided across the body frames 5 substantially below the center of the body frames 5, and a swing arm 12 is disposed swingably around the pivot shaft 11 and resiliently by a rear cushion unit 13 and a link lever, not shown, while a rear wheel is supported rotatably by the rear end of the swing arm 12. Further, a portion of the side surface of the vehicle body is covered by a vehicle body cover 14.

Figure 2:
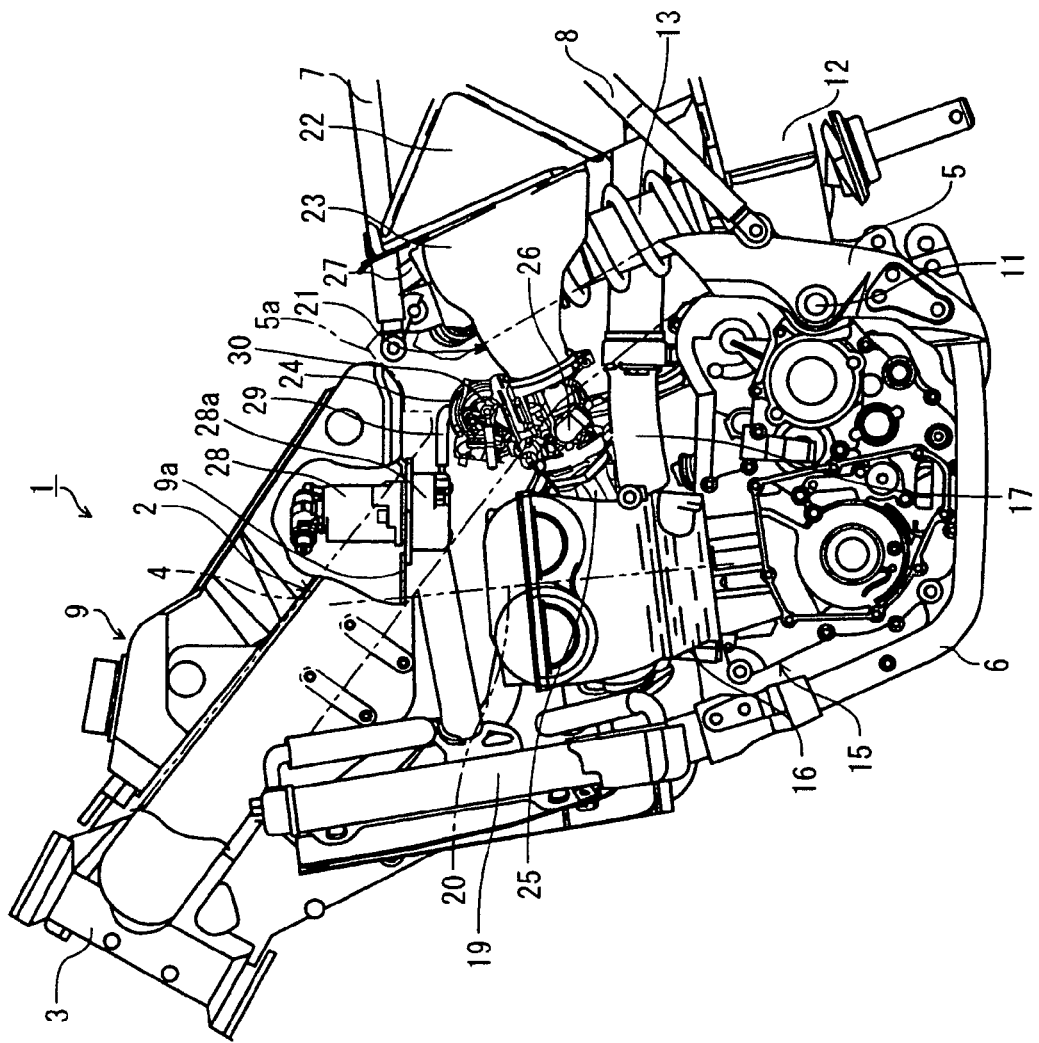
FIG. 2 is an enlarged view of a front half portion of FIG. 1.

FIG. 2 is an enlarged view of the front half portion of FIG. 1, indicating a state in which the vehicle body cover 14 is removed while portion of the main frame 4, the body frame 5 and the fuel tank 9 are partially cutaway.

As shown in FIG. 1 and FIG. 2, a four-stroke-cycle single-cylinder engine 15 is mounted in a space, centrally lower portion of the vehicle body, surrounded by the main frames 4, the body frame 5 and the cradle frame 6, via a plurality of engine mount brackets. This engine 15 is provided with a cylinder assembly 16 standing substantially vertically in an orthogonal direction, and an exhaust pipe 17 is connected to the front portion of the cylinder assembly 16. The exhaust pipe 17 extends around the right side portion of the cylinder assembly 16 and then extends backward, and the downstream end of the exhaust pipe 17 is connected to a muffler 18 disposed in one side of the vehicle body, which is right side below the rider's seat 10 in this embodiment, and disposed so as to rise obliquely backward. A radiator 19 is disposed in front of and above the cylinder assembly 16.

Further, an intake port, not shown, is connected to a fuel combustion chamber in the engine 15 at the rear portion of the cylinder assembly 16. The downstream end of an intake air passage 21 rising backward, while crossing a plane orthogonal to a cylinder axis 20, is connected to the intake port, and on the other hand, the upstream end of the intake air passage 21 extending backward is connected to an air cleaner box 22 disposed below the rider's seat 10.

The intake air passage 21 and the cylinder assembly 16 are provided so that the highest portion of the intake air passage 21 exists at a position higher than the upper edge of the cylinder assembly 16 as seen in a side view.

The intake air passage 21 is provided with a connecting pipe 23, a throttle body 24 and an intake pipe 25, which are arranged in this order from the air cleaner box 22 toward a combustion chamber in the engine 15, and the intake pipe 25 is connected to the intake port. The throttle body 24 is provided with a fuel injector 30, which constitutes an electronic fuel injection device. The fuel injector 30 is provided for a throttle body of the intake air passage at a top portion thereof, and extends upwardly from a top surface of the throttle body.

In the meantime, reference numeral 26 denotes a throttle position sensor also constituting the electronic fuel injection device. Further, the connecting pipe 23 is provided with an intake air temperature sensor 27 which constitutes another electronic fuel injection device.

The fuel tank 9 is provided above the cylinder assembly 16 such that a bottom surface 9a of the fuel tank 9 is located at a position higher than the highest portion of the intake air passage 21. A fuel pump 28 for pressure-feeding the fuel in the fuel tank 9 to the fuel injector of the throttle body 24 is provided in the fuel tank 9. The fuel pump 28 is configured so as to be installed on the bottom surface 9a of the fuel tank 9 from the bottom side and disposed at the rear portion of the fuel tank 9 and preferably behind the cylinder axis 20 of the cylinder assembly 16. The fuel pump 28 includes a downwardly extending portion 28a extending downwardly from a bottom surface of the fuel tank at a portion between the cylinder center axis and the fuel injector 30 in a side view of the motorcycle.

Further, although not shown in detail, the fuel pump 28 is disposed such that the major portion thereof overlaps the cylinder assembly 16 in a plan view, and, in other words, the rear portion of the cylinder assembly 16 overlaps at least a portion of the fuel pump 28 in the longitudinal direction of the vehicle in a side view. Then, a fuel hose 29 is connected from the fuel pump 28 to the fuel injector. The fuel hose 29 is connected with a peripheral surface of the downwardly extending portion 28a of the fuel pump 28.

Furthermore, the rider's seat 10 is disposed above the intake air passage 21. The rider's seat 10 has a side surface shape which is recessed at the central portion thereof with respect to the front and rear portions, and the front portion of the rider's seat 10 is placed on the upper surface of the rear portion of the fuel tank 9, while the rear portion of the rider's seat 10 is placed on the seat rail 7. The central portion of the rider's seat 10 is supported by the bridge frame 5a throughout the vehicle width direction.

The described embodiment will achieve the following effects and functions.

The fuel tank 9 is disposed above the cylinder assembly 16 arranged in the engine 15, and the fuel pump 28 is installed on the bottom surface 9a of the fuel tank 9 from the bottom side so as to be disposed at the rear portion of the fuel tank 9 and to be overlapped with at least a portion of the fuel pump 28, preferably, the major portion thereof overlaps the cylinder assembly 16 as seen in a plan view. Accordingly, the peripheral portion of the engine 15 can be arranged compact and the height of the engine 15 can be suppressed with the minimum road clearance being secured, thus lowering the gravity center.

Since a gap between the engine 15 and the fuel tank 9 is kept small, the fuel tank 9 can be disposed in proximity of the engine 15 to thereby concentrate the mass. Furthermore, since the fuel pump 28 is installed on the bottom surface 9a of the fuel tank 9 and disposed at the rear portion in the fuel tank 9, the fuel pump 28 can be disposed near the intake air passage 21, particularly the throttle body 24, whereby the length of the fuel pipe (fuel hose 29) can be reduced. As a result, the influence of expansion of the fuel pipe and the like can be reduced, and thus, the fuel pump 28 having a small discharge capacity can be realized.

The exhaust pipe 17 and the radiator 19 exist as a heat source affecting the fuel supply system badly. However, a fuel suction portion of the fuel pump 28 can be placed apart from the fuel pump 28 by connecting the exhaust pipe 17 to the front portion of the cylinder assembly 16 and disposing the radiator 19 in front of and above the cylinder assembly 16 while disposing the fuel pump 28 at the rear portion in the fuel tank 9, thereby preventing air from being mixed into fuel to the fuel injector.

Particularly, in this embodiment, the upper portion of the cradle frame 6 connected to the head pipe 3 is constructed as a single structure and the radiator 19 is mounted on the right and left sides thereof. As a result, any radiator element as a heat source does not exist in front of the fuel pump 28, and accordingly, the bottom portion of the fuel pump 28 projecting downward from the bottom surface 9a of the fuel tank 9 is never exposed to a high temperature.

In the engine 15 mounted on the motorcycle 1, an ignition plug, not shown, is often disposed on the cylinder axis 20, and this ignition plug is installed so as to be tilted in the vehicle width direction in order to suppress the entire height of the engine 15. Then, the fuel pump 28 housed in the fuel tank 9 is disposed behind the cylinder axis 20 of the cylinder assembly 16, thereby improving the detachability of the ignition plug.

Furthermore, the highest portion of the intake air passage 21 is disposed at a position higher than the upper edge of the cylinder assembly 16 in a side view, and the fuel tank 9 is disposed such that the bottom surface 9a of the fuel tank 9 is placed at a position higher than the highest portion of the intake air passage 21. Accordingly, the intake air passage 21 can be disposed so as to extend obliquely upward in the backward direction, while crossing a plane orthogonal to the cylinder axis 20. As a result, it becomes possible to directly take the air into the intake port, thus improving the air suction efficiency and increasing the output power.

Still furthermore, the central portion of the rider's seat 10 is recessed downward with respect to the front and rear portions, and the front portion of the rider's seat 10 is placed on the upper surface of the fuel tank 9 rear portion. As a result, the front end of the rider's seat 10, that is, the upper surface of the rear portion of the fuel tank 9, can be set higher than the central portion of the rider's seat 10. Thus, the rear portion of the fuel tank 9 can be set at a relatively high position, and consequently, the fuel pump 28 can be disposed at the rear portion of the fuel tank 9. Accordingly, the fuel pump 28 can be disposed in proximity of the throttle body 24 to thereby reduce the length of the fuel pipe (fuel hose 29).

It is further to be noted that the present invention is not limited to the described embodiment and many other changes and modifications may be made without departing from the scopes of the appended claims.

What is claimed is:

1. A fuel supply device for a straddle type motorcycle, the motorcycle including a frame, an engine mounted on the frame and having a substantially vertical cylinder assembly and an intake air passage extended backward from a rear surface of the cylinder assembly, a fuel tank disposed above the cylinder assembly and a radiator, the fuel supply device comprising:
    a fuel pump disposed at a rear portion of the fuel tank, the fuel pump being overlapped with the cylinder assembly in a longitudinal direction of the motorcycle in a side view of the motorcycle;
    a fuel injector installed on the intake air passage, wherein the intake air passage includes a throttle body; and
    a fuel hose connecting the fuel injector with the fuel pump, wherein the fuel pump housed in the fuel tank includes a downwardly extending portion extending downwardly from a bottom surface of the fuel tank and is disposed behind a cylinder center axis of the cylinder assembly, and the radiator is disposed in front of the center axis of the cylinder assembly, and the downwardly extending portion of the fuel pump is disposed between the cylinder axis and the throttle body in a side view of the motorcycle.

2. The fuel supply device for the motorcycle according to claim 1, wherein an exhaust pipe is connected to a front portion of the cylinder assembly.

3. The fuel supply device for the motorcycle according to claim 1, wherein the throttle body is provided with the fuel injector at a top portion thereof, the fuel injector extending upwardly from a top surface of the throttle body.

4. The fuel supply device for the motorcycle according to claim 3, wherein the fuel hose is connected with a peripheral surface of the downwardly extending portion of the fuel pump.

5. The fuel supply device for the motorcycle according to claim 1, wherein the intake air passage extends backward so as to rise from the downstream end of the intake air passage which is connected to an intake port so as to cross a plane perpendicular to the cylinder center axis.

* * * * *